United States Patent [19]

Plotto

[11] 4,327,387
[45] Apr. 27, 1982

[54] MAGNETIC HEAD SLIDER ASSEMBLY COMPRISING AT LEAST ONE TRANSDUCER FOR READING AND/OR RECORDING INFORMATION CONTAINED ON A DATA CARRIER

[75] Inventor: Michel Plotto, Plaisir, France

[73] Assignee: Compagnie Internationale pour l'Informatique CII/Honeywell Bull, Paris, France

[21] Appl. No.: 110,921

[22] Filed: Jan. 10, 1980

[30] Foreign Application Priority Data

Jan. 17, 1979 [FR] France .................................. 79 01142

[51] Int. Cl.³ .......................... G11B 5/22; G11B 5/60; G11B 17/32
[52] U.S. Cl. .................................... 360/103; 360/122; 428/333; 428/336; 428/900
[58] Field of Search ............... 360/103, 102, 122, 128, 360/130.2; 428/332–333, 336, 216, 900

[56] References Cited

U.S. PATENT DOCUMENTS

| | | | |
|---|---|---|---|
| 3,919,717 | 11/1975 | Cullen et al. | 360/122 |
| 3,993,824 | 11/1976 | Shirahata et al. | 428/336 |
| 4,023,208 | 5/1977 | Feit et al. | 360/122 |
| 4,087,582 | 5/1978 | Shirahata et al. | 428/333 |
| 4,124,736 | 11/1978 | Patel et al. | 428/216 |
| 4,137,361 | 1/1979 | Deffeyes et al. | 428/333 |
| 4,218,715 | 8/1980 | Garnier | 360/103 |

OTHER PUBLICATIONS

IBM Tech. Disc. Bull., J. R. Morrison et al., Magnetic Transducer Head, vol. 7, No. 4, Sep. 1964, p. 333.
IBM Tech. Disc. Bull., F. d'Heurle et al., Silicon Nitride Protection for Magnetic Heads, vol., 19, No. 1, Jun. 1976, p. 351.

Primary Examiner—Alfred H. Eddleman
Attorney, Agent, or Firm—Edward J. Kondracki

[57] ABSTRACT

A magnetic head slider assembly comprising a body supporting at least one transducer for reading and/or recording the information contained in a data carrier. At least a part of the surface of the body which faces the data carrier is constituted by an extremely thin lubricating monomolecular layer with polar termination. The thickness of the layer is such that the ratio of the thickness to the flight height of the surface or height of the body is less than a thousandth.

4 Claims, 9 Drawing Figures

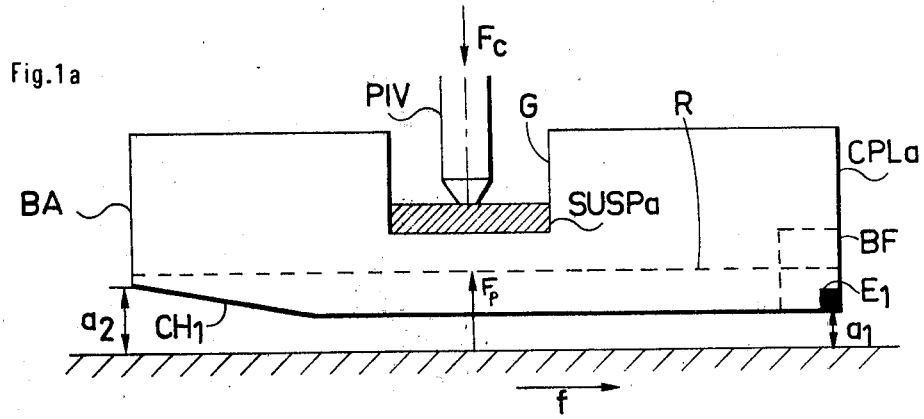
Fig.1a
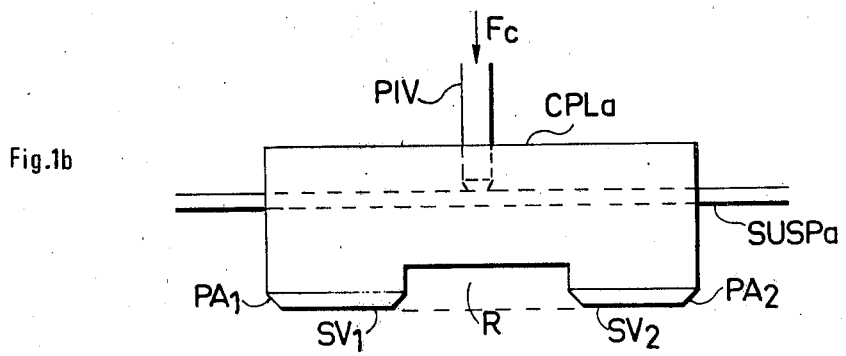
Fig.1b
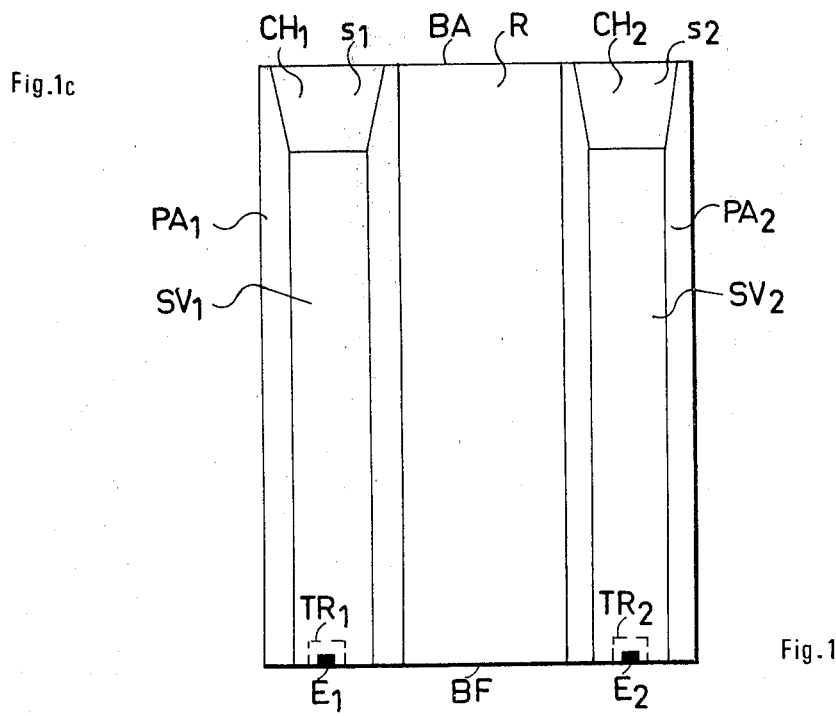
Fig.1c
Fig.1

MAGNETIC HEAD SLIDER ASSEMBLY COMPRISING AT LEAST ONE TRANSDUCER FOR READING AND/OR RECORDING INFORMATION CONTAINED ON A DATA CARRIER

BACKGROUND OF THE INVENTION

1. Field of the Invention

The present invention relates to a magnetic head slider assembly comprising at least one transducer for reading and/or recording information contained on a data carrier. It is more particularly applicable to magnetic reading and/or recording transducers utilized in magnetic peripherals of data processing systems, in particular disc memories.

2. Description of the Prior Art

The use of magnetic disc memories in data processing systems is becoming more popular due to their storage capacity and the relatively short time taken by the reading and/or recording transducers (also called read and-/or write transducers) to access data contained anywhere on the discs from the moment when the transducers receive an order to access this data.

Generally, magnetic discs carry data on concentric, circular recording tracks whose radial width does not exceed a few hundredths of a millimeter and which cover the major proportion of both faces of the discs. The discs, which are parallel, coaxial, and generally of the same diameter, are driven at a constant speed of rotation by an electric motor. Current practice is to associate a single transducer with each face of the disc. If it is desired to substantially reduce the time taken to access all the information contained on the disc face, several transducers, not exceeding 10 or 20 units in number and less than the number of tracks, are associated with the disc face. In the remainder of the text, the expression "disc face" will imply the association of the latter with one or more transducers.

Generally, transducers associated with one disc face are carried by the same main body of the transducer assembly and are mounted on a platform. This latter platform further comprises a suspension device fixed to the main body and to a movable rigid arm.

Platforms fall in two general categories, either a movable type platform or a fixed type platform. Movable type platforms are displaced radially above the face of the disc face with which they are associated to permit the transducer to access all the information contained in the latter. In this case a movable arm is mounted on a carriage which is displaced externally of the disc. Fixed type platforms, on the other hand, remain permanently stationary above clearly defined tracks on the face of the disc with which they are associated during the reading and/or recording operations, and each of the transducers contained within the platform remains associated with one and the same track. The platforms used most frequently in current practice are moving type platforms.

Usually the transducers are formed by a magnetic circuit around which is placed a winding and which has an air gap. This winding is connected by input and/or output electric conductors to the electronic circuits for reading and/or recording on a disc memory. The variation of induction within the air gap of each transducer permits the reading and/or recording of data contained on the face of the disc.

Generally, but not exclusively, the main body of the platform is in the shape of a relatively shallow right-angles parallelepiped of which a first "major face", which is opposite the face of the disc, contains the air gap or air gaps of the transducer(s), the second "major face" containing the input and/or output lead conductors of this (these) transducer(s). In the course of rotation of the disc, a cushion of compressed air is formed between the disc and the first "major face" often main body, which prevents the body from touching the disc and thus from damaging it. It is therefore said that the main body flies above the disc. The distance between the airgap (airgaps) of the transducer(s) and the disc face is called "flight altitude" or indeed "flight height" of the main body. It is usually of the order of some tenths of microns. The air cushion exerts pressure on all or part of the first "major face" of the main body normal to the latter and directed towards its second "major face". The part of the first major face which is under pressure of the air cushion is termed the "flight surface". The force resulting from this is termed lift force of the main body. It is a function of the flight surface. Dynamic equalibrium of the main body in flight is obtained by opposing the lift force with a force equal and opposite to it, called the "loading force" which is generally applied to the second "major face".

When the disc is not turning, the main body occupies a so called "rest" position with regard to it. In current practice there are used more and more frequently main bodies of platforms whose flight surface, in its rest position, is in contact at least partially with the disc face. Such main bodies are called "main bodies with unstick" contact. Generally available platforms comprising such main bodies are manufactured, for example, by the "Applied Magnetic Corporation" under the reference Winchester 3304 and 3306, and are known as the "Winchester" platform.

The main body of such a platform is constructed in the following manner: One or more gulleys (also called grooves), the depth of which is greater than or equal to 30 microns and may be as much as a few tenths of a millimeter, are formed in its first "major face". As a result there are several projecting portions, termed skids, on this major face.

An aeronautical analogy may be given using the terminology used in aeronautics. The main body may be likened to the wing of an aircraft. Air runs along the wing body in the direction of movement of the disc reaching, first of all, a face of the main body known as the "leading edge" which is perpendicular to the first "major face" and to the direction of movement of the disc. The other face of the main body, which is parallel to the leading edge, is termed the "tail edge".

The flight surface comprises two parts, namely: A first part, known as the main flight surface, which rests on the disc when the main body is in the rest position. It connects the tail edge to the main body. A second part, known as a separation surface, in the form of a bevel, is inclined to the main flight surface and extends it by connection with the leading edge. To move the main body from its rest position to its flight position above the disc, it is only necessary to rotate the disc sufficiently to develop a lift force. In quite a short time the body will unstick or separate from the disc due to the lift force. When the disc reaches its nominal speed of rotation the body will fly above it, its main flight surface being inclined towards the disc. The angle of inclination is in the order of a few milli-radians, the lift force being enough for body flight to be stable.

The drawback of conventional "main bodies with unstick contact" is that they rub against the disc during the unstick period which, as seen above, is relatively long. This results in wear both on the disc and the flight surface.

Before proceeding with a discussion of the invention, the reader may familiarize himself with the following U.S. Pat. Nos. and applications for patent for a better understanding of the prior art and problems associated with slider assemblies for magnetic transducers: 3,657,710; 3,678,482; 3,855,625; 4,081,846 and Ser. Nos. 958,840 (Plotto) filed Nov. 8, 1978, now U.S. Pat. No. 4,212,044; 034,747 (Lazzari) filed Apr. 30, 1979, now U.S. Pat. No. 4,258,400; and 737,725 (Desseri) filed May 10, 1978, now U.S. Pat. No. 4,261,024. The latter pending applications for patent are all assigned to the assignee of the present invention.

With the terminology adopted, the flight altitude is never nil even if the lubricating layer of the main body and the lubricating film of the disc are in contact. In this condition, the flight of the main body is said to be hydrodynamic and not aerodynamic. The definition of the flight surface as specified above for aerodynamic flight can be extended to any type of hydrodynamic flight. The flight surface is thus that part of the face of the main body on which the lift force, whether it is aerodynamic or hydrodynamic, is exerted.

It is known from current practice that magnetic discs may be covered with a lubricating film for protection of the magnetic recording layer.

The properties of monomolecular lubricating layers as well as the different methods for depositing them on solid surfaces are well known. They are described, for example, in the thesis of M. TADEUSZ G. MATHIA given in Lyon on Oct. 16, 1978 under the title "Study of Sliding Interface of Monomolecular Lubrication". Reference may also be made to GAINES: "Insoluble Monolayers At Liquid-gas Interfaces" published by John Wiley, New York (1966) and TABOR D. "Friction, Lubrication, Wear" in *Surface and Colloid Science* volume 5, edited by E. MATIJEVIC, John Wiley (1965).

Lubricating monomolecular layers comprise long chain and polar termination organic molecules. The probability of these terminations having an unequal electric moment is very great. These are, for example, organic molecules of fatty acid which have the property that they can be absorbed by the metal surfaces on which it is desired to deposit them with a high bonding energy, by means of their polar terminations. The free ends of these molecules form a sort of fibre mat, as described in the aforenoted thesis of Mathia, formed by an arrangement of "Methyl $CH_3$" groups of very low superficial energy. This explains the lubricating properties of these monomolecular layers (also called Monolayers or limited lubrication layers.)

SUMMARY OF THE INVENTION

The principal object of the invention is to reduce wear in the disc and flight surface by decreasing the coefficient of friction between the flight surface of the main body and the disc face. To this end, there is deposited on the flight surface an extremely thin lubricating layer. The layer is preferably an organic monomolecular layer of polar termination. The thickness of this layer is of the order of some tens of angstroms. It can be said that the flight surface is formed by the thin lubricating layer itself.

Thus, as compared to prior art slider assemblies, the main bodies according to the invention can sustain a large number of impacts between their flight surface and the disc face associated with their transducer(s) for an equal number of unsticks and for the same total flight duration. An important advantage results since the greater the flight altitude of a main body the smaller the risk of having a high number of impacts between the flight surface and the face of the disc. It is possible in accordance with the present invention to have the main bodies flying at a lower altitude than those of the prior art, which permits the transducer(s) to supply higher amplitude signals and make them much easier to read. At the extreme limit, the flight altitude of the main bodies in accordance with the present invention can be practically nil (i.e. of the order of a few angstroms to some tens of angstroms).

According to the invention, the slider assembly comprises a main body having at least one transducer for reading and/or recording the data contained on the data carrier, and is characterized in that at least a part of the surface which faces the data carrier is formed by an extremely thin lubricating layer. In a preferred embodiment of the invention the lubricating layer is a monomolecular polar layer.

BRIEF DESCRIPTION OF THE DRAWINGS

Other characteristics and advantages of the invention will appear in the following description given by way of non-limiting example, and with reference to the attached drawings.

In the drawings:

FIG. 3a is a side view, FIG. 3b is a front view, and FIG. 3c is a view from below;

DESCRIPTION OF THE PREFERRED EMBODIMENT

Figure 2:
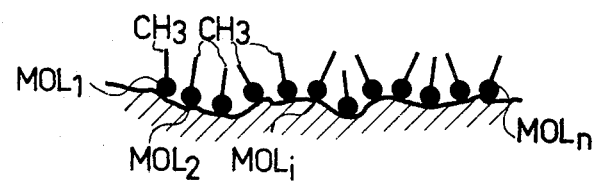
FIG. 2 is a schematic representation of the lubricating monomolecular layer deposited on any surface.

So as better to understand the principles of the construction and functioning of the slider assembly or platform which, according to the invention, contains at least one transducer, it is useful to recall on the one hand the principles of construction and functioning of main bodies of such platforms according to prior art, as illustrated in FIG. 1, and on the other hand of lubricating polar monomolecular layers as illustrated in FIG. 2.

Figure 1D:
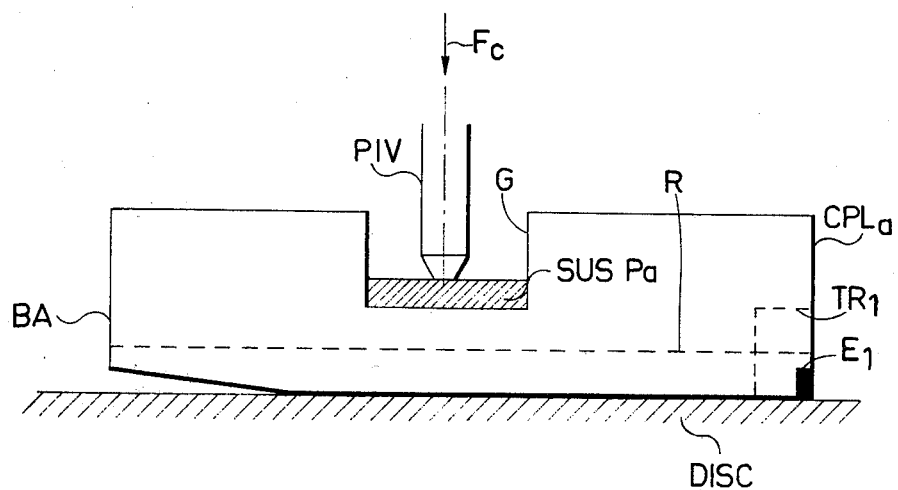
FIG. 1 shows a main body of the platform according to the prior art, in flight above a magnetic disk, and comprises FIGS. 1a, 1b, 1c and 1d.
FIG. 1a is a side view.
FIG. 1b is a front view.
FIG. 1c is a view from below, and 1d shows the main body in its rest position on the magnetic disc.

Referring to FIG. 1, a Winchester platform is illustrated. Such a platform comprises a main body $CPL_a$. Body $CPL_a$ is basically parallelepipedic in shape (FIG. 1e) and is represented by a catamaran shape (FIG. 1b) comprising two skids $PA_1$ and $PA_2$ separated by a groove R in the lower major face adjacent the disc face. A suspension device $SUSP_a$ (FIG. 1d) passes through upper groove G as viewed in the drawing. Each of the two skids $PA_1$ and $PA_2$ support a transducer at one end. Skid $PA_1$ supports transducer $TR_1$ and skid $PA_2$ supports the transducer $TR_2$. The read and/or recording air gaps of transducers $TR_1$ and $TR_2$ are respectively designated as $E_1$ and $E_2$.

The skid $PA_1$ comprises a main flight surface $SV_1$ which is extended at one end by a bevel $CH_1$ of surface $s_1$. Skid $PA_2$ has a main flight surface $SV_2$ which is extended by a bevel $CH_2$ of flight surface $s_2$. The total flight surface SV of the body $CPL_a$ is equal to $[(SV_1+SV_2)+s_1+s_2]$ where $(SV_1+SV_2)$ is the main flight surface and $(s_1+s_2)$ is the unstick surface. As can be seen from FIG. 1a, where the main body $CPL_a$ is shown in flight above magnetic disc DISC which moves is driven at a constant speed in the direction of the arrow f, the platform is slightly inclined with respect to the disc surface so that the air gap $E_1$ and the air gap $E_2$ of transducers $TR_1$ and $TR_2$ are situated at a flight altitude $a_1$ above the disc. Altitude $a_1$ is less than the distance $a_2$ which separates the bevels $CH_1$ and $CH_2$ from the disc surface. The main flight surface of the platform therefore makes a very small angle of the order of a few tenths of milli-radians to the disc surface. The angle between the bevels $CH_1$ and $CH_2$ and the main flight surface is of the order of a few milli-radians.

Bevels $CH_1$ and $CH_2$ meet the leading edge BA of the main body $CPL_a$, while the airgaps $E_1$ and $E_2$ are situated at the tail edge BF. The lift force $F_p$ of the main body is balanced by the force of the load $F_c$ applied, for example, by means of the pivot PIV. The suspension device $SUSP_a$ is fixed on the one hand to the main body $CPL_a$ within gulley G formed in the upper face of the latter and, on the other hand, by any appropriate means to a rigid movable arm which carries the platform $PL_a$ (not shown, to simplify FIG. 1). Reference, however, may be made to the aforenoted applications Ser. Nos. 034,747 and 037,725 for typical suspension arrangements.

When the main body $CPL_a$ is at rest, its main flight surface is in contact with the disc DISC (FIG. 1d). On unsticking or separation of the main body $CPL_a$ from the disc surface, the main body occupies a set of intermediate positions between the rest position shown in FIG. 1d and the flight position above the disc as shown in FIG. 1a. During the unstick time $t_d$, i.e. the time it takes for the main body to separate from the disc surface, the part of the main flight surface which unsticks or separates first is that situated at the leading edge side BA, and it is possible at that time for all or any part of the flight surface to come into contact at any moment with the disc DISC. The friction between the flight surface and the disc DISC resulting from these contacts can cause wear in them, as has been noted above.

Referring to FIG. 2, there is represented a monomolecular lubricating layer comprising a plurality of molecules with polar terminations, $MOL_1$, $MOL_2$, . . . $MOL_i$, . . . $MOL_n$ deposited on any solid. The monomolecular layer and the solid are shown schematically and enlarged for clarity. The layer is deposited on the solid, for example, by means of the absorption method described in the work of A. S. AKMATOV, entitled "Molecular Physics of Boudnard Lubrication" published by the Israel Programme for Scientific Translations, 1966. The molecules $MOL_1$ to $MOL_n$ are absorbed onto the surface of the solid by their polar extremities, shown by a black circle in FIG. 2. The remaining chains of each molecule (shown by a line linked to the polar extremity in FIG. 2) form a sort of "fibre carpet", of which the free surface is formed by a set of "methyl $CH_3$" terminal groups (also called free radicals) of very low superficial energy. It is the existence of this very low superficial energy free surface which is shown to permit the assembly constituted by the solid and the monomolecular layer to have a very low coefficient of friction with respect to any other solid which comes into contact with it.

Figure 3:
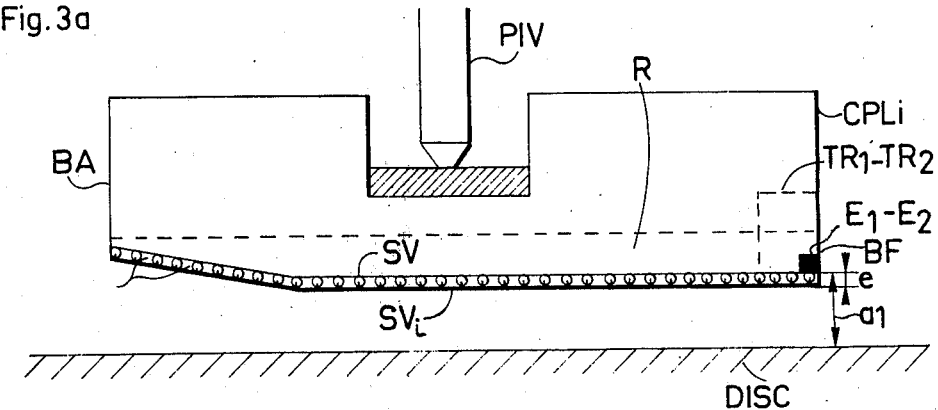
FIG. 3 illustrates a main body of the platform or slider assembly according to the invention in flight above a magnetic disc, and comprises FIGS. 3a, 3b and 3c.
Figure 3:
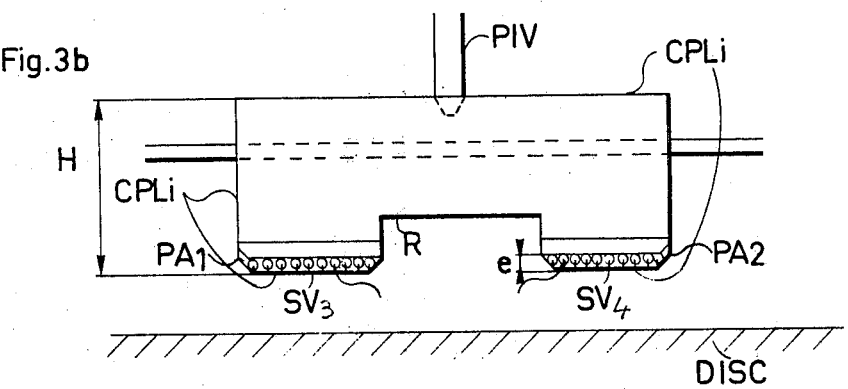
Figure 3:
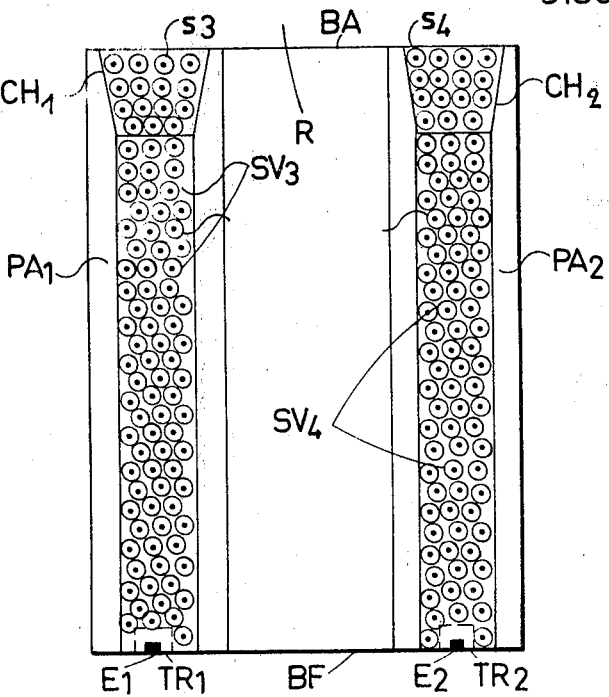

According to the invention, in order to reduce the coefficient of friction between the flight surface of the main body $CPL_a$ and the disc DISC, during unsticking, the flight surface is coated with a monomolecular polar lubricating layer MONOMOL of the type shown schematically in FIG. 2. This MONOMOL layer can, for example, be constituted by a fatty acid such as stearic acid. Thus, according to the invention, the slider assembly includes a main body $CPL_i$ constituted by the combination of the main body $CPL_a$ according to prior art and the MONOMOL molecular layer and shown in FIG. 3 where, for simplification, the same references as as in FIG. 1 are retained for the same elements.

The MONOMOL layer can be fixed to the surface $SV_1$ and $SV_2$ of the skids $PA_1$ and $PA_2$, $s_3$ and $s_4$ of the bevels $CH_1$ and $CH_2$, by the AKMOTOV absorption method above cited. The thickness e of the MONOMOL layer is of the order of a few tens of angstroms and almost negligible in comparison to the flight height $a_1$ which is of the order of 0.4 microns, i.e. 4000 angstroms and to the height of the main body. The ratios $e/a_1$ and $e/H$ are, therefore, very small and less than a thousandth. The result is that the flight conditions of the main bodies $CPL_a$ and $CPL_i$ are practically identical. Due to the thinness of the MONOMOL lubricating layer and the position between the surface and main body, the layer itself forms the flight surface $SV_i$ of the main body $CPL_i$. If the surfaces of the MONOMOL layer which respectively cover the surfaces $SV_1$ and $SV_2$ of skids $PA_1$ and $PA_2$ are designated respectively $SV_3$ and $SV_4$, and the surfaces of this same layer which cover the surface $s_1$ and $s_2$ respectively of the bevels $CH_1$ and $CH_2$ are designated as $s_3$ and $s_4$, one has $(SV_1+SV_2)$ substantially equal to $(SV_3+SV_4)$ and $(s_1+s_2)$ substantially equal to $(s_3+s_4)$ and SV substantially equal to $SV_i$.

Figure 4:
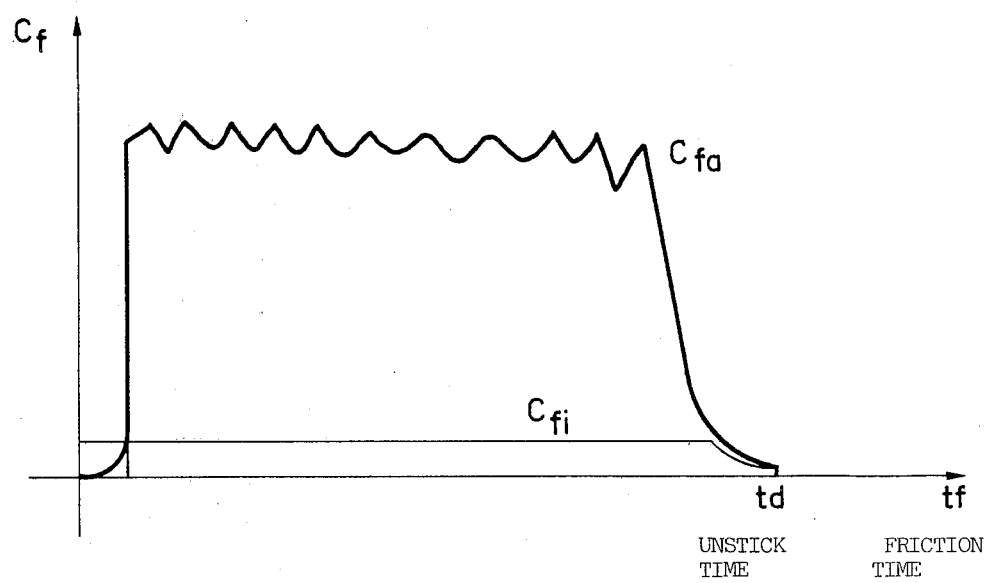
FIG. 4 is a graph of the variation of the coefficient of friction between the flight surface of the main body according to the invention and the face of the disc associated with it, during unsticking.

Referring to FIG. 4, $C_{fa}$ and $C_{fi}$ designate respectively the friction coefficients of the main bodies $CPL_a$ and $CPL_i$, which are measured during the unstick time $t_d$. These coefficients become zero when the separation of the body and surface is completed. If the two curves of variation of the two friction factors $C_{fa}$ and $C_{fi}$ shown in FIG. 4 are considered as a function of the friction time $t_f$, it will be seen that the friction factor $C_{fa}$ is much greater than the friction factor $C_{fi}$. The ratio $C_{fa}/C_{fi}$ is of the order of 5.

The advantage of the slider assembly according to the invention with regard to those of prior art: a greater number of unsticks can be obtained before the platform is considered useless (in this case the MONOMOL layer has been destroyed; and for the same number of unsticks, it is possible to use disc drive motors with weaker starting torques since the friction is weaker) than the motors used with the slider assemblies according to the prior art and which, are therefore, less expensive than those of the prior art.

While the execution has been described with respect to a particular embodiment, it should be apparent that the description is not given by way of limitation and other modifications will suggest themselves to those skilled in the art. Accordingly, resort should be made to the appended claims for a full appreciation of the full scope and true spirit of the invention.

I claim:

1. A magnetic head slider assembly comprising a body supporting at least one transducer for reading and/or recording of the data contained in a data carrier, one surface of said body adapted to face the data carrier, at least one part of said surface being constituted by a lubricating monomolecular layer having polar termination and a thickness in the range of 30 to 50 angstroms.

2. A magnetic head slider assembly as set forth in claim 1 wherein the entire surface of said body adapted to face the data carrier constitutes the monomolecular layer with polar termination.

3. In an improved fly-off transducer platform of catamaran shape comprising two skids separated by a groove forming one major face of the platform adapted to face a data carrier, each of the two skids supporting at one end thereof a read/write transducer for reading and/or recording of data on the data carrier, each of the two skids having a flat surface extending along the length thereof, said skids being divided into two portions comprising a main flight surface extending from said one end to a point intermediate the other end and a bevel surface extending from said intermediate point to the other end, the angle between the bevel surfaces and the main skid surfaces being in the order of a few milliradians, the improvement comprising a monomolecular lubricating layer having polar-termination on said skid surfaces and a thickness in the range of 30 to 50 angstroms.

4. An improved fly-off transducer as set forth in claim 3 wherein the lubricating layer extends the entire length of said skids.

* * * * *